United States Patent
Soda et al.

(10) Patent No.: US 9,707,983 B2
(45) Date of Patent: Jul. 18, 2017

(54) TRACK STATUS MONITORING DEVICE

(71) Applicant: CENTRAL JAPAN RAILWAY COMPANY, Nagoya-shi (JP)

(72) Inventors: Yoshinobu Soda, Nagoya (JP); Iwao Masuda, Nagoya (JP)

(73) Assignee: CENTRAL JAPAN RAILWAY COMPANY, Nagoya-Shi (JP)

(*) Notice: Subject to any disclaimer, the term of this patent is extended or adjusted under 35 U.S.C. 154(b) by 414 days.

(21) Appl. No.: 14/402,433

(22) PCT Filed: Apr. 25, 2013

(86) PCT No.: PCT/JP2013/062212
§ 371 (c)(1),
(2) Date: Nov. 20, 2014

(87) PCT Pub. No.: WO2013/175930
PCT Pub. Date: Nov. 28, 2013

(65) Prior Publication Data
US 2016/0114817 A1    Apr. 28, 2016

(30) Foreign Application Priority Data

May 25, 2012    (JP) .................................. 2012-119837

(51) Int. Cl.
B61K 9/08    (2006.01)
G01B 21/20    (2006.01)
(Continued)

(52) U.S. Cl.
CPC ................. B61K 9/08 (2013.01); G01B 11/14 (2013.01); G01B 11/24 (2013.01); G01B 21/20 (2013.01)

(58) Field of Classification Search
None
See application file for complete search history.

(56) References Cited

U.S. PATENT DOCUMENTS 3,924,461 A * 12/1975 Stover ...................... B61K 9/08
33/523.2
4,173,073 A * 11/1979 Fukazawa .............. G01C 15/00
104/7.2

(Continued)

FOREIGN PATENT DOCUMENTS

DE    10256122    6/2004
DE    102009007568    8/2010
(Continued)

OTHER PUBLICATIONS

Office Action from related Japanese Application No. 2012-119837 dated Apr. 26, 2016. English translation attached.
(Continued)

Primary Examiner — Robert R Raevis
(74) Attorney, Agent, or Firm — Grossman, Tucker, Perreault & Pfleger, PLLC

(57) ABSTRACT

Providing a track status monitoring device comprising an acceleration detection unit disposed on a railway car and detecting an acceleration at least in the axle direction among accelerations generated on a wheel of the railway car; a rail position detection unit disposed on the railway car and detecting a value indicating a position of the rail in relation to the wheel in the axle direction; an integration unit that calculates a value based on a $2^{nd}$-order integrated value of the acceleration detected by the acceleration detection unit; and a subtraction unit that counterbalances an undulating component of the wheel by subtracting a value detected by the rail position detection unit from a value calculated by the integration unit, and calculates an amount of horizontal-direction displacement of the rail.

6 Claims, 14 Drawing Sheets

(51) Int. Cl.
*G01B 11/14* (2006.01)
*G01B 11/24* (2006.01)

(56) References Cited

U.S. PATENT DOCUMENTS

| | | | |
|---|---|---|---|
| 5,247,338 | A | 9/1993 | Danneskiold-Samsoe et al. |
| 2014/0341435 | A1* | 11/2014 | Shimada .................. B61K 9/08 382/104 |

FOREIGN PATENT DOCUMENTS

| | | | |
|---|---|---|---|
| JP | H06116903 | | 4/1994 |
| JP | H11281330 | | 10/1999 |
| JP | 2001063570 | | 3/2001 |
| JP | 2001270668 | * | 10/2001 |
| JP | 2008122299 | * | 5/2008 |
| JP | 2009300397 | | 12/2009 |
| JP | 2011156995 | | 8/2011 |
| JP | 2011163981 | | 8/2011 |
| WO | 90/12720 | | 11/1990 |

OTHER PUBLICATIONS

Extended European Search Report from related European Application No. 13793575.5 dated Feb. 22, 2016.
English Translation of the International Preliminary Report on Patentability from corresponding PCT Appln. No. PCT/JP2013/062212 dated Dec. 18, 2014.
Office Action from related Chinese Application No. 201380025931.0 dated Jun. 17, 2016. English Summary of the Office Action attached.
International Search Report from related PCT Appln. No. PCT/JP2013/062212, dated Jun. 4, 2013.
Form PCT/IPEA/408 from related PCT Appln. No. PCT/JP2013/062212, dated May 27, 2014.
Form PCT/IPEA/409 from related PCT Appln. No. PCT/JP2013/062212, dated Sep. 10, 2014.

* cited by examiner

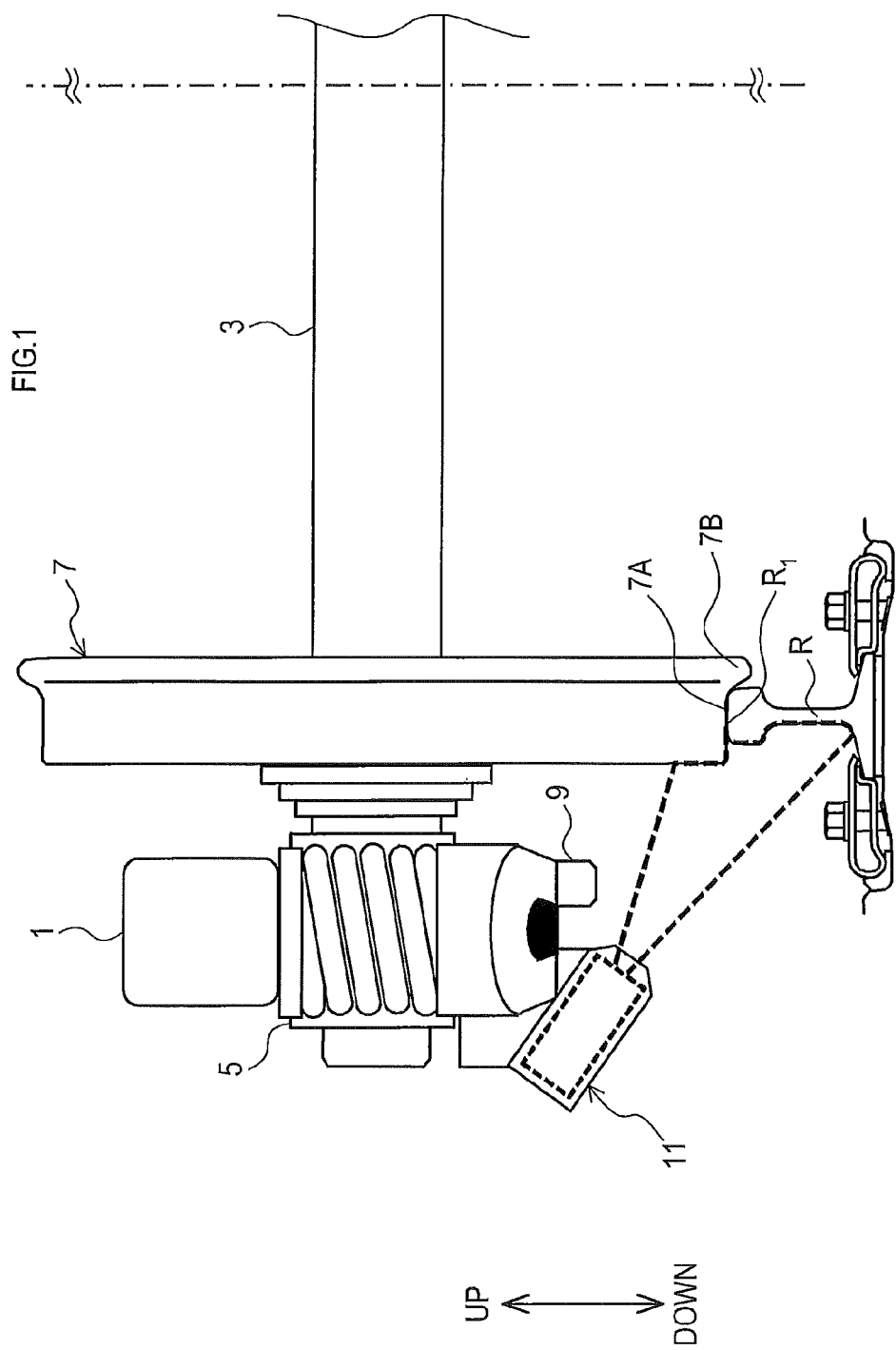

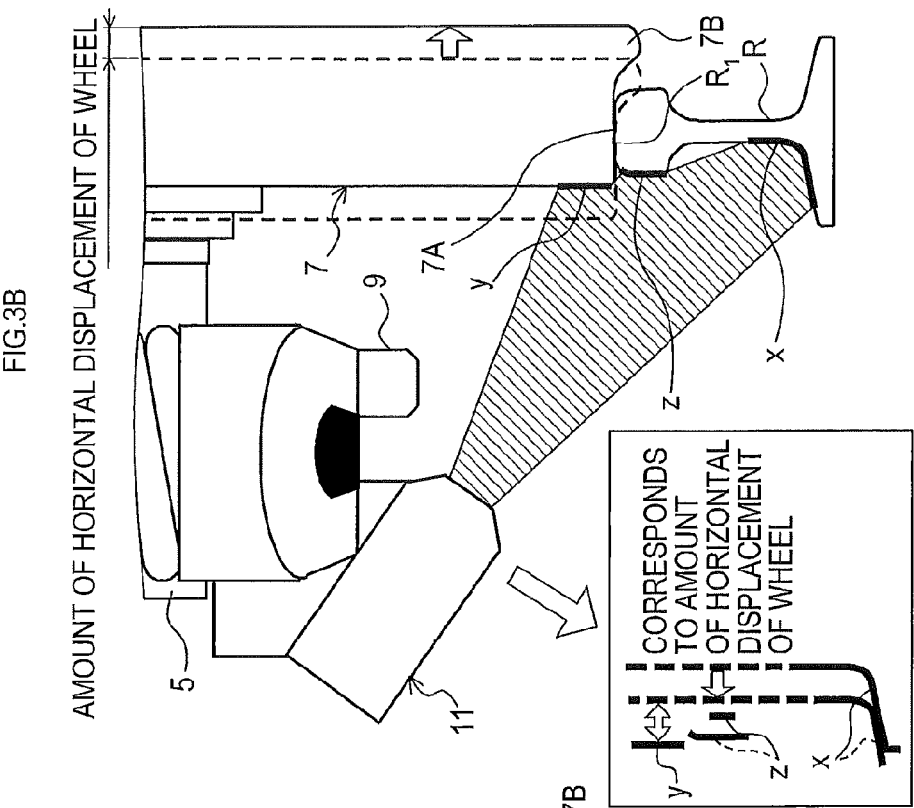
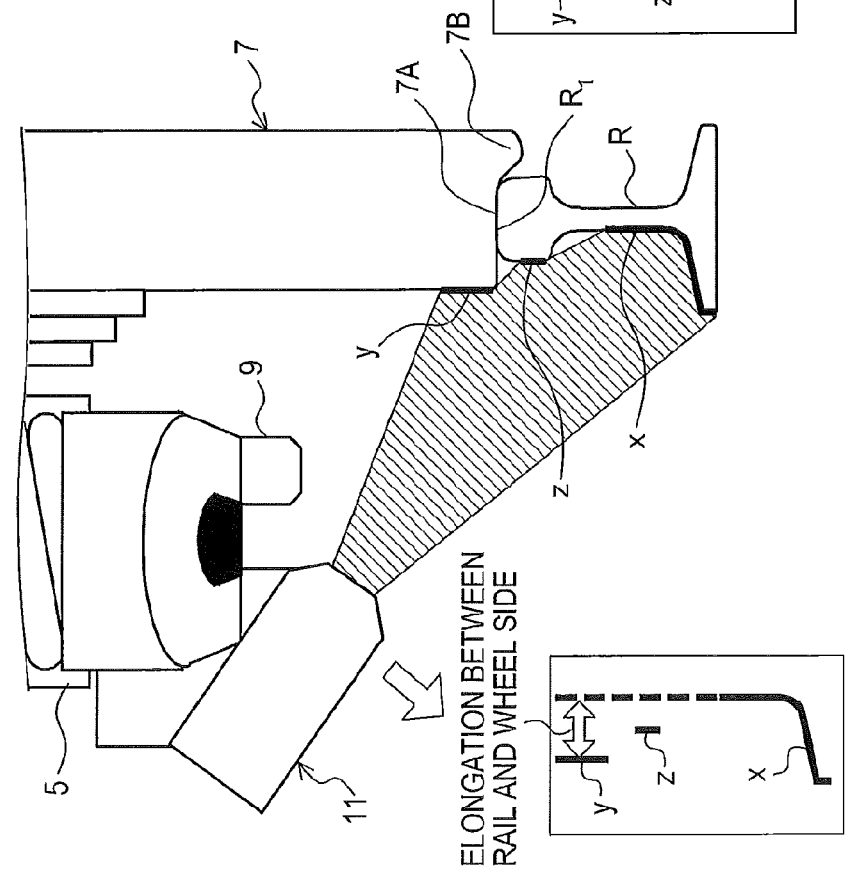
FIG.3A
FIG.3B

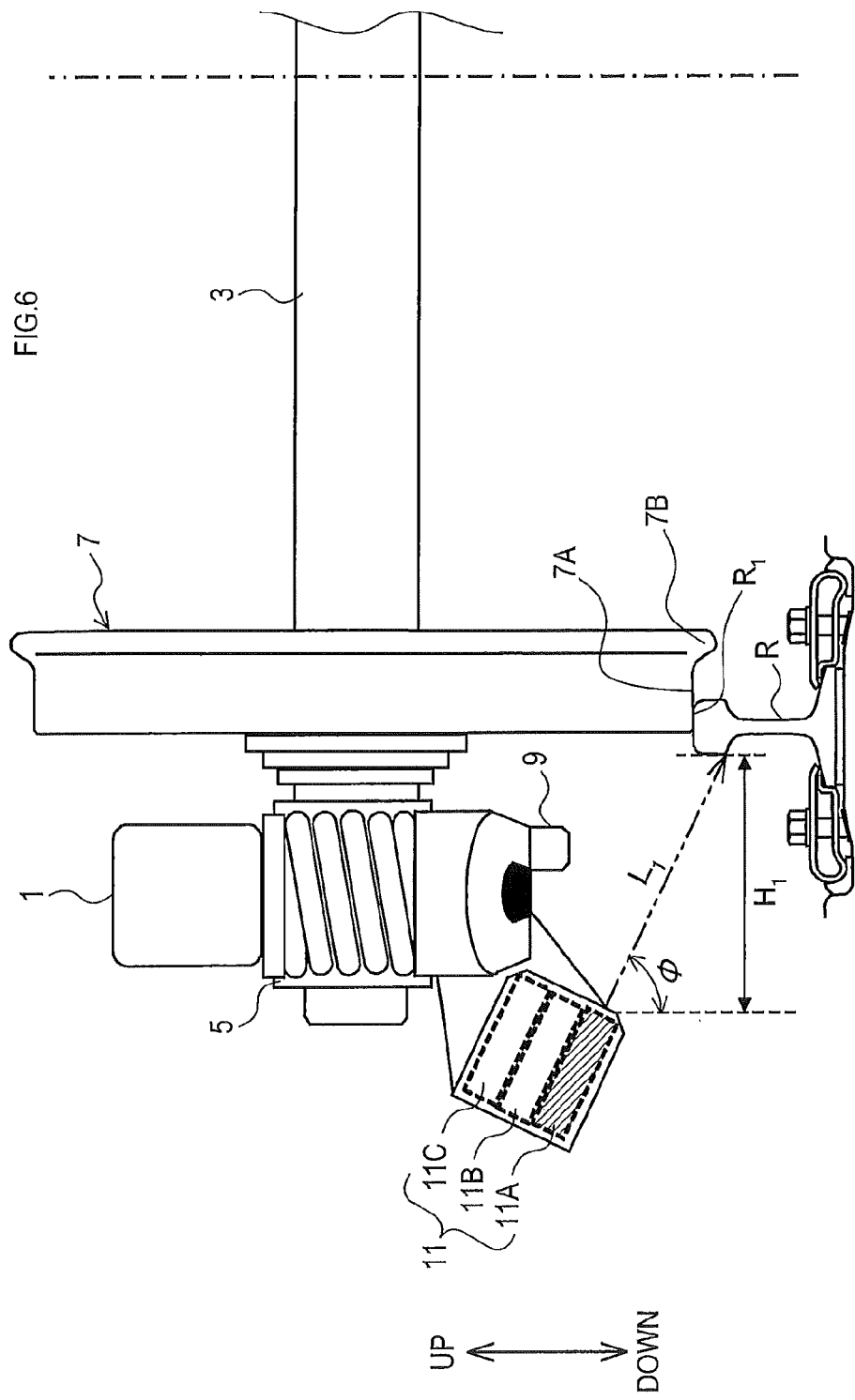

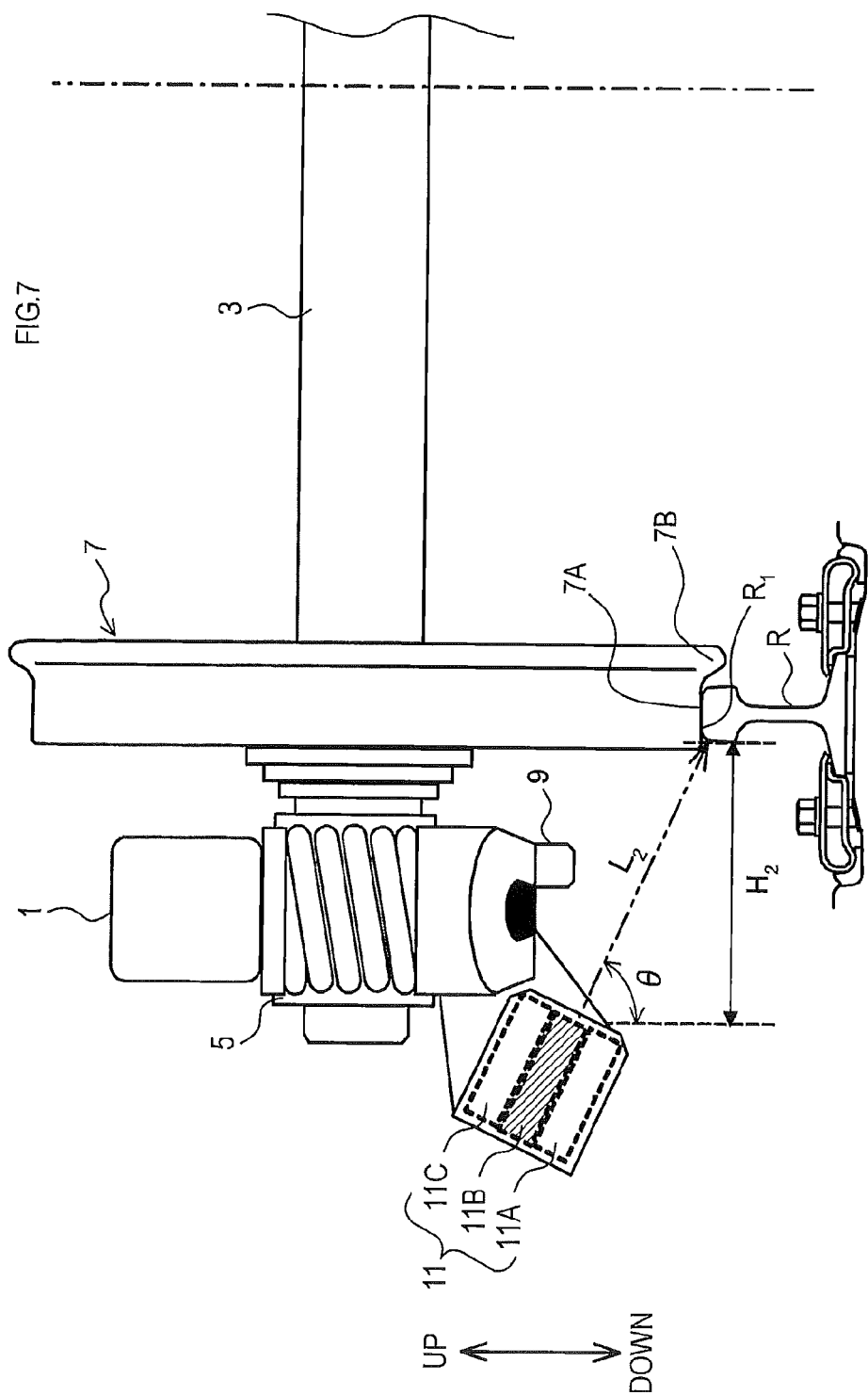

US 9,707,983 B2

TRACK STATUS MONITORING DEVICE

CROSS-REFERENCE TO RELATED APPLICATIONS

This is a U.S. National Phase Application under 35 U.S.C. §371 of International Patent Application No. PCT/JP2013/062212 filed Apr. 25, 2013, which claims the benefit of Japanese Patent Application No. 2012-119837 filed May 25, 2012 in the Japan Patent Office, and the entire disclosure thereof is incorporated herein by reference.

TECHNICAL FIELD

The present invention relates to a track status monitoring device that detects an amount of a horizontal-direction displacement of a rail for a railway car.

BACKGROUND ART

For example, the track status monitoring device described in Patent Document 1 calculates a vertical-direction displacement of a rail (hereinafter referred to as a "vertical irregularity"), etc. by performing a $2^{nd}$ order integration of an acceleration detected by an accelerometer that is attached to an axle box or a car body, and thereby obtains a track irregularity.

PRIOR ART DOCUMENTS

Patent Documents

Patent Document 1: Japanese Unexamined Patent Application Publication No. 2009-300397

SUMMARY OF THE INVENTION

Problems to be Solved by the Invention

Incidentally, a wheel tread of a railway car may be regarded as touching a rail at all times. In this state, vertical-direction components of a wheel track are mostly consistent with a vertical-direction displacement of the rail (i.e. a vertical irregularity). The vertical irregularity can therefore be easily obtained with high enough accuracy for practical purposes by performing a $2^{nd}$ order integration of a vertical-direction acceleration of the wheel or an axle box.

A gauge between a pair of left and right rails, however, is slightly larger than a gauge between a pair of left and right wheel flanges; therefore, there is a minute slit between the rails and the wheel flanges. The pair of wheels thus moves along the rails while slightly undulating within the slit, as if to thread its way through.

In this case, a $2^{nd}$-order integrated value of a horizontal-direction acceleration of the wheel or the axle box is not necessarily consistent with a horizontal-direction displacement of the rail (hereinafter referred to as a "horizontal displacement"). Thus, even if the horizontal-direction acceleration is $2^{nd}$-order integrated, it is difficult to calculate the horizontal displacement with high enough accuracy for practical purposes.

The first aspect of the present invention preferably calculates the horizontal displacement easily with high enough accuracy for practical purposes.

Means for Solving the Problems

The present invention is a track status monitoring device that detects an amount of horizontal-direction displacement of a rail for a railway car to run, the device comprises an acceleration detection unit that is disposed on the railway car and detects at least an axle-direction acceleration among accelerations generated on a wheel of the railway car; a rail position detection unit that is disposed on the railway car and detects a value, which indicates an axle-direction position of the rail in relation to the wheel; an integration unit that calculates a value based on a $2^{nd}$-order integrated value of the acceleration detected by the acceleration detection unit; and a subtraction unit that counterbalances an undulating component of the wheel by subtracting the value detected by the rail position detection unit from the value calculated by the integration unit, and calculates an amount of a horizontal-direction displacement of the rail.

The undulating component of the wheel can be counterbalanced by subtracting the rail position in relation to the wheel from the value obtained by $2^{nd}$-order integrating the acceleration. As a consequence, the influence of the slit between the rail and the wheel flange can be eliminated according to the present invention. A horizontal displacement can therefore be easily calculated with high enough accuracy for practical purposes.

The "horizontal displacement" is the horizontal-direction displacement of the rail including a so-called "line alignment irregularity". The "line alignment irregularity" is generally used to refer to a rail unevenness inside (at the gauge-corner side of) the rail. In the present application, the "line alignment irregularity" may be either the rail unevenness inside the rail, or a rail unevenness outside (at the field-corner side of) the rail.

Embodiments of the present invention are hereinafter described with reference to the drawings.

BRIEF DESCRIPTION OF THE DRAWINGS

FIG. 1 illustrates a configuration of a track status monitoring device according to Embodiment 1.

FIGS. 3A and 3B are explanatory diagrams illustrating detection of a rail position by a two-dimensional laser displacement gauge.

FIG. 6 illustrates a configuration of the track status monitoring device according to Embodiment 2.

FIG. 7 is an explanatory diagram of a characteristic actuation of the track status monitoring device according to Embodiment 2.

EXPLANATION OF REFERENCE NUMERALS

1 . . . truck frame, 3 . . . axle, 5 . . . axle box, 7 . . . wheel, 7A . . . wheel tread, 7B . . . wheel flange, 9 . . . acceleration detection unit, 11 . . . rail position detection unit, 11A~11C . . . spot laser displacement gauges, 13 . . . displacement calculation unit, 13A . . . integration unit, 13B . . . rail position calculation unit, 13C . . . subtraction unit.

MODE FOR CARRYING OUT THE INVENTION

Matters specifying the invention, etc. described in the Claims are not limited to the particular methods and structures indicated in the below embodiments.

The device according to the embodiments is a track status monitoring device to which the present invention is applied. The track status monitoring device is configured to detect an amount of a horizontal-direction displacement of a rail for a high-speed railway car such as the Shinkansen to run.

[Embodiment 1]

1. Configuration of Track Status Monitoring Device

An axle box 5 supporting an axle 3 is disposed on a truck frame 1 of a railway car as indicated in FIG. 1. The axle box 5 is disposed on both left and right sides. The axle 3 is provided so as to extend in the direction orthogonal to a pair of left and right rails R for the railway car to run. A wheel 7 is disposed on both sides of the axle 3 in the axle direction. FIG. 1, however, illustrates the wheel 7 of only one side.

The wheel 7 is provided with a wheel tread 7A and a wheel flange 7B. The wheel tread 7A rotates as it touches a top surface R1 of the rail R. The wheel flange 7B rotates as it touches the inside one (the gauge-corner side) of the rail R side surfaces.

Figure 2A:
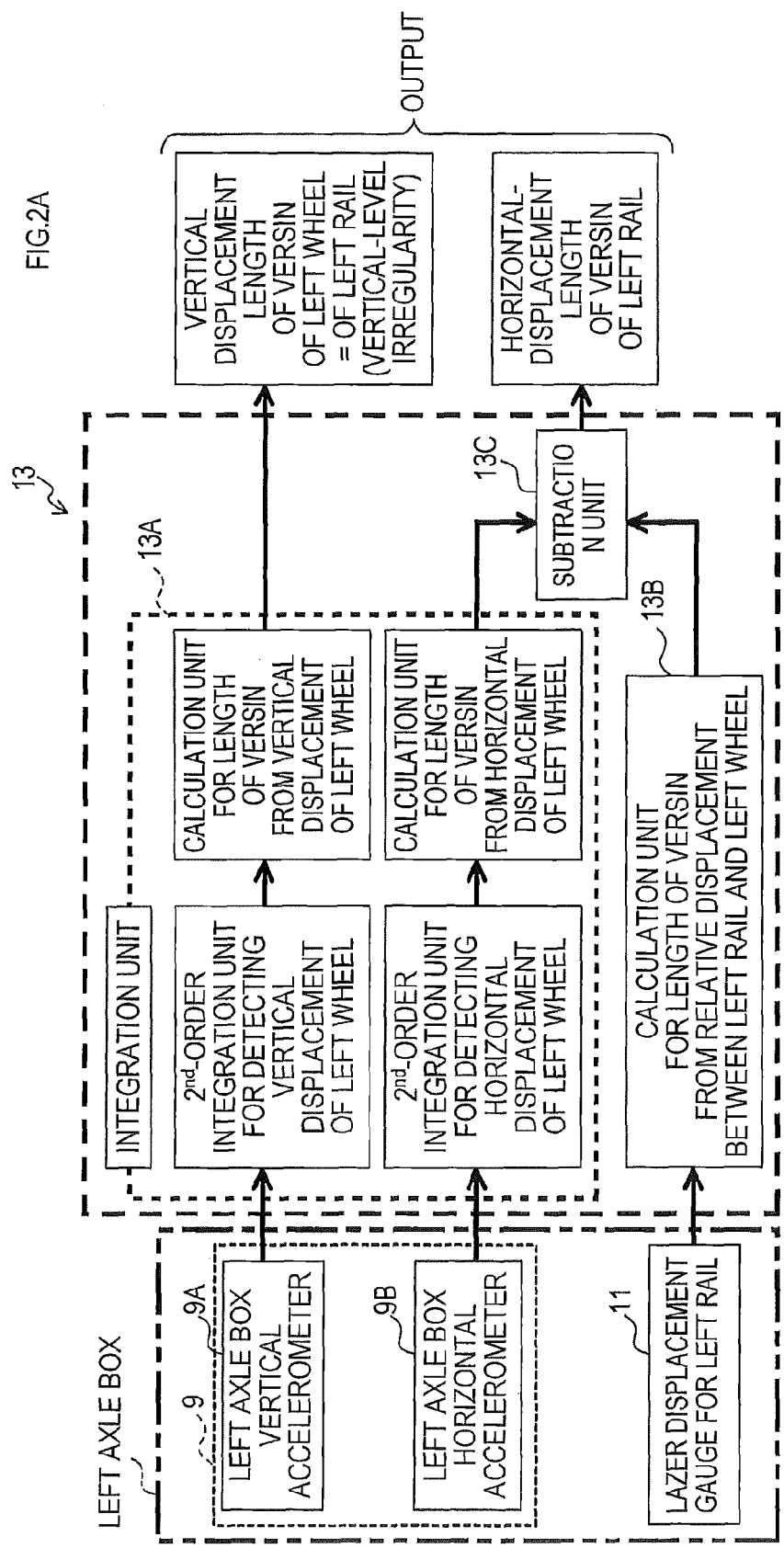
FIG. 2A is a schematic diagram of a displacement calculation unit according to Embodiment 1.
Figure 2B:
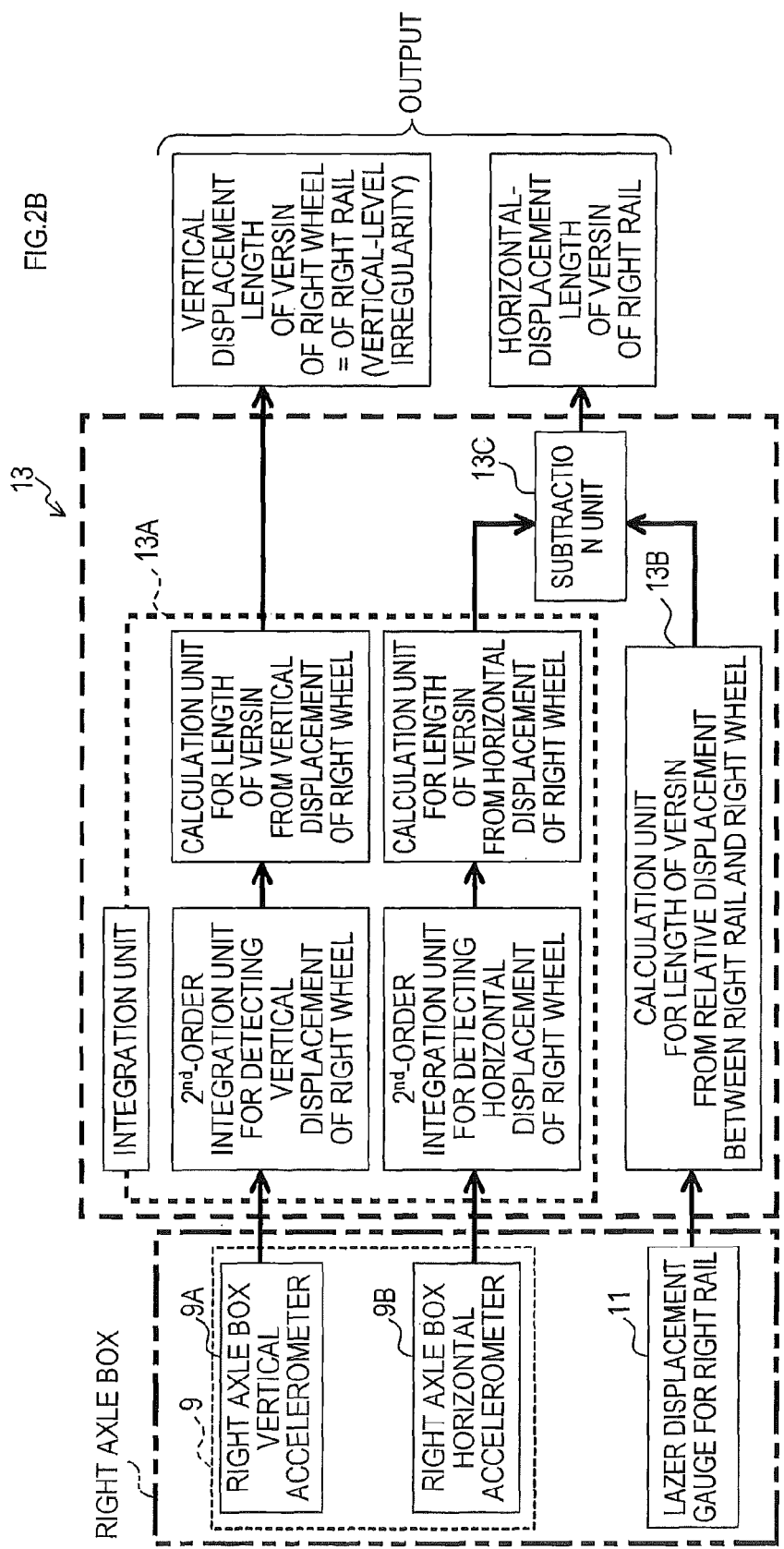
FIG. 2B is a schematic diagram of the displacement calculation unit according to Embodiment 1.

The axle box 5 rotatably supports the axle 3. The axle box 5 is arranged closer to the axle end than wheel 7. Each of a pair of left and right axle boxes 5 is provided with an acceleration detection unit 9 as illustrated in FIG. 2A and FIG. 2B. The acceleration detection unit 9 detects a vertical-direction acceleration, and an axle-direction (i.e., horizontal-direction) acceleration of axle 3. In particular, the acceleration detection unit 9 is provided with an accelerometer 9A that detects the vertical-direction acceleration, and an accelerometer 9B that detects the horizontal-direction acceleration.

Provided that the axle box 5 supports the axle 3, and at the same time, the axle 3 is integrated with the wheel 7, the axle box 5 configures a rigid body part that is integrally displaced with the wheel 7. The acceleration detection unit 9 disposed on the axle box 5 can thus detect a vertical-direction and a horizontal-direction acceleration generated on the wheel 7.

The acceleration detection unit 9 that is disposed on the left axle box 5 detects a vertical-direction and a horizontal-direction acceleration generated on a left wheel 7 (see FIG. 2A). The acceleration detection unit 9 that is disposed on the right axle box 5 detects a vertical-direction and a horizontal-direction acceleration generated on a right wheel 7 (see FIG. 2B).

Each of the pair of left and right axle boxes 5 is provided with a rail position detection unit 11 that detects a position of the rail in relation to the wheel 7 in the axle-direction (a horizontal-direction) as illustrated in FIG. 1. This rail position detection unit 11 is configured with a two-dimensional laser displacement gauge. The rail position detection unit 11 is a non-contact displacement gauge that includes a light emitting section and a light receiving section. The two-dimensional laser displacement gauge can measure a distance from the rail position unit 11 to an object, as well as the width of the object.

The rail position detection unit 11 (i.e., the two-dimensional laser displacement gauge) according to the present embodiment can concurrently measure a distance from the rail position detection unit 11 to the rail R, and a distance from the rail position detection unit 11 to the wheel 7 as illustrated in FIG. 3A. Consequently, the position of the rail in relation to the wheel 7 (in the axle direction (hereinafter referred to as a "rail position" in short)) can be detected.

In the present embodiment, the rail position is detected based on a difference between a distance from the rail position detection unit 11 to a neck x of the rail R or to an external side z of the rail, and a distance from the rail position detection unit 11 to an external side surface y of the wheel 7. Therefore, when the wheel 7 moves in relation to the rail R in the axle direction as a car runs, the rail position is displaced accordingly as illustrated in FIG. 3B.

Figure 4:
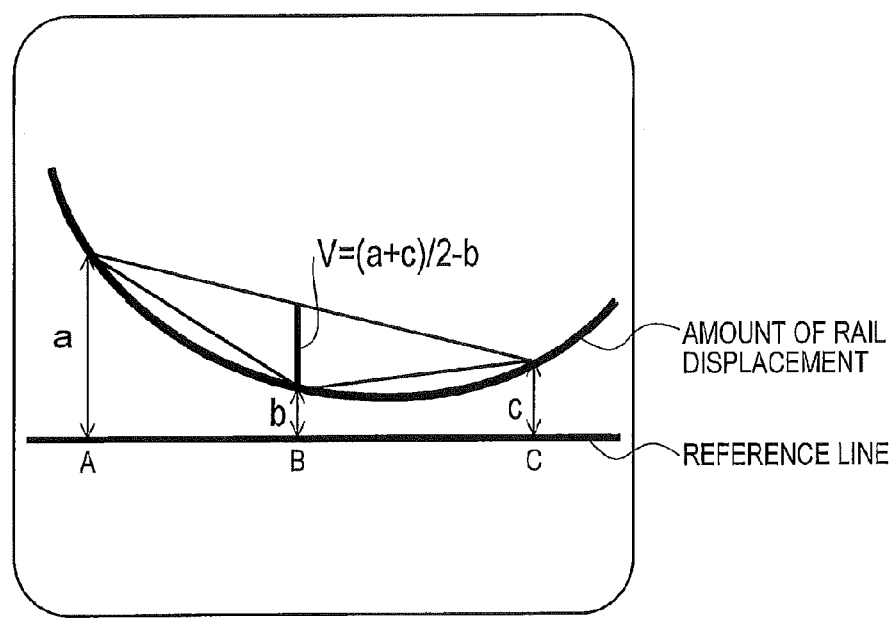
FIG. 4 is an explanatory diagram of a length of versin.

2. Calculation Unit for Length of Versin 2.1 Status of Rail in Vertical Direction The status of the rail R, in other words, the degree of so-called "vertical-level irregularity" and "line alignment irregularity" is generally determined based on a length of versin. Here, the length of versin V is defined as illustrated in FIG. 4.

Specifically, any two points on the rail R in the longitudinal direction are named point A and point C. The halfway point between point A and point C is named point B.

When amounts of displacement of the rail R at point A, point B, and point C are named a, b, and c respectively, the length of versin V is equal to "(a+b)/2−b".

In the present embodiment, with regard to the "vertical-level irregularity", a $2^{nd}$-order integrated value of the vertical-direction acceleration at each point is calculated as the amount of displacement of the rail R at the point. The amount of the vertical-direction displacement of the rail R is calculated with the point of reference being the point at which the vertical-direction acceleration is 0.

The "vertical-level irregularity" (a vertical-direction length of versin V at a given point) is calculated first by figuring out the sum (a value that corresponds to the above a+c) of $2^{nd}$-order integrated values of the vertical-direction acceleration of two points (correspond to point A and point C), between which the given point is provided; and then subtracting a $2^{nd}$-order integrated value of the vertical-direction acceleration (a value that corresponds to the above b) of the given point (corresponds to point B) from a value attained by dividing the sum (=a+c) by 2.

2.2 Status of Rail in Horizontal Direction

Figure 5A:
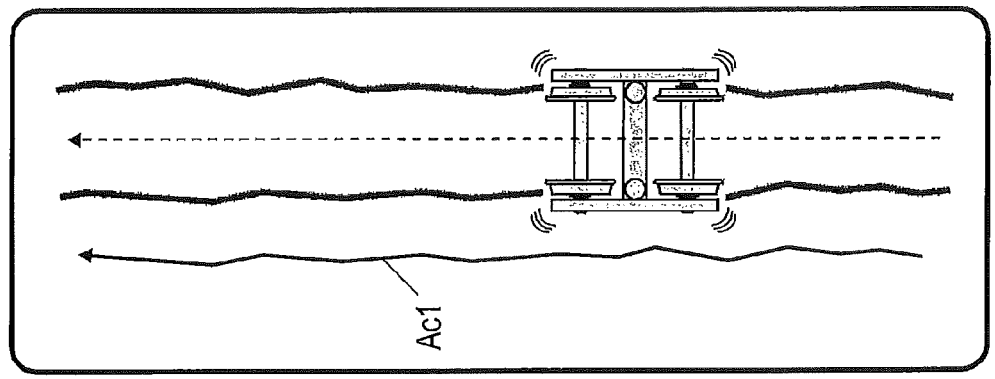
FIGS. 5A and 5B illustrate a detection principle of the track status monitoring device according to an embodiment of the present invention.
Figure 5B:
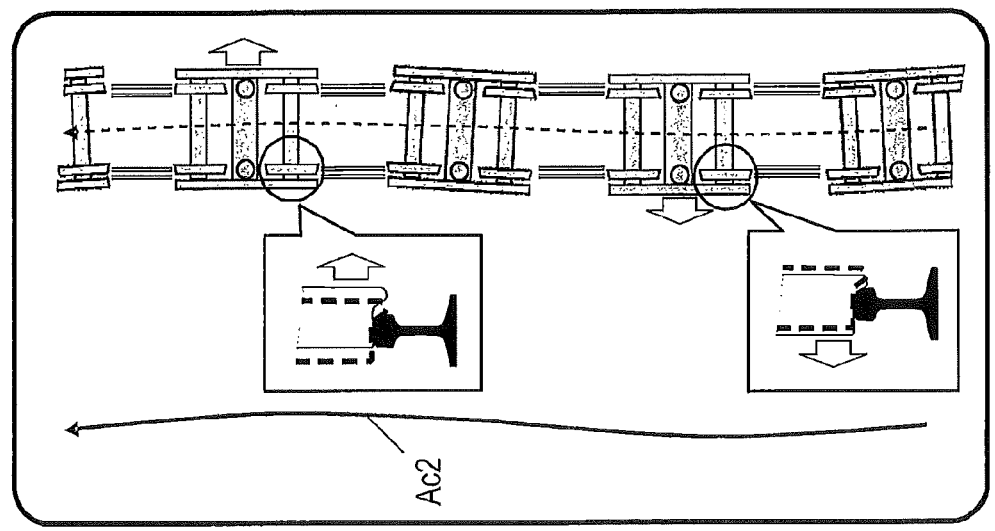

The status of the rail in the horizontal direction is determined based on a horizontal-direction length of the versin. However, since the acceleration detection unit 9 detects an acceleration generated on the wheel 7, the horizontal-direction acceleration detected by the acceleration detection unit 9 is a value of an acceleration Ac2 that is illustrated in FIG. 5B added to an acceleration Ac1 that is illustrated in FIG. 5A. The acceleration Ac1 is a horizontal-direction acceleration generated on the wheel 7 by horizontal-direction displacement of the rail R. The acceleration Ac2 is a horizontal-direction acceleration generated on the wheel 7 by undulation of the wheel 7 in relation to the rail R.

In the present embodiment, the status of the rail R in the horizontal direction is determined with a value, the length of versin of the horizontal-direction displacement, calculated by subtracting the length of versin based on the rail position detected by the rail position detection unit 11 from a length of versin based on the $2^{nd}$-order integrated value of the acceleration detected by the accelerometer 9B.

In this case, the length of versin of the horizontal-direction displacement is a length of versin indicating an amount of horizontal-direction displacement of the rail R after undulating components of the wheel 7 are counterbalanced. In this embodiment, as illustrated in FIG. 2A and FIG. 2B, a length of versin to indicate the horizontal-direction displacement on the left rail and a length of versin to indicate the horizontal-direction displacement on the right rail are calculated.

To be more precise, a displacement calculation unit 13 according to this embodiment is provided with an integration unit 13A, a rail position calculation unit 13B, and a subtraction unit 13C. The integration unit 13A calculates a length of versin based on a $2^{nd}$-order integrated value of an acceleration detected by the acceleration detection unit 9 (hereinafter referred to as a length of combined versin).

The integration unit 13A calculates a horizontal-direction length of versin and a vertical-direction length of versin. In this embodiment, an exclusive calculation circuit is provided for each length of versin to be calculated; lengths of versin are obtained by laterally actuating these calculation circuits.

The rail position calculation unit 13B calculates a length of versin based on a position of a rail detected by the rail position detection unit 11 (hereinafter referred to as a length of relative versin). The length of relative versin is calculated for each of the right rail and the left rail. The subtraction unit 13C subtracts the length of relative versin calculated by the rail position calculation unit 13B from the horizontal-direction length of combined versin calculated by the integration unit 13A.

Specifically, the subtraction unit 13C subtracts the length of relative versin for the left rail from the length of combined versin for the left rail; and subtracts the length of relative versin for the right rail from the length of combined versin for the right rail. The displacement calculation unit 13 according to this embodiment outputs at least four types of lengths of versin.

The acceleration detection unit 9, the rail position detection unit 11, and the displacement calculation unit 13, etc. are disposed on the first or the last car in a multiple-unit (e.g., 16 cars) train.

The horizontal-direction length of versin and a vertical-direction length of versin that are calculated by the track status monitoring device, namely the displacement calculation unit 13, are transmitted to a track maintenance center terminal and a management department terminal from a central command terminal after being transmitted to a central monitoring center via radio communication and cable line.

3. Characteristics of Track Status Monitoring Device in Embodiment 1

As mentioned above, the horizontal-direction acceleration detected by the acceleration detection unit 9 is a value of the horizontal-direction acceleration generated on the wheel 7 by undulation of the wheel 7 in relation to the rail R added to the horizontal-direction acceleration generated on the wheel 7 by a horizontal-direction displacement of the rail R.

The length of versin obtained by subtracting the length of relative versin from the length of combined versin is a length of versin based on an amount of displacement obtained by subtracting the length of relative versin of the rail in relation to the wheel 7 from a combined amount of displacement in horizontal direction obtained by $2^{nd}$ order integration of the horizontal-direction acceleration.

Since the undulating components of the wheel 7 can be counterbalanced by subtracting the rail position in relation to the wheel 7 from a value obtained by $2^{nd}$-order integrating the acceleration, the length of versin obtained by subtracting the length of relative versin from the length of combined versin indicates the horizontal-direction length of versin with the undulating components of the wheel 7 being counterbalanced.

In light of the above, since an influence of the slit between the rail R and the wheel flange 7B can be eliminated according to this embodiment, a horizontal displacement can be easily calculated with high enough accuracy for practical purposes.

[Embodiment 2]

In the above embodiment, the rail position detection unit 11 is configured with the two-dimensional laser displacement gauge; however, as illustrated in FIG. 6, the rail position detection unit 11 may also be configured with a plurality of spot laser displacement gauges 11A to 11C that are arranged in parallel.

The spot laser displacement gauge cannot measure a width of an object, although it can measure a distance to the object. For this reason, for example, a distance from the spot laser displacement gauge 11A to the rail R can be measured in a state illustrated in FIG. 6; however, when the wheel 7 moves in the horizontal direction in relation to the rail R to the state illustrated in FIG. 7, the distance to the rail R cannot be measured by the spot laser displacement gauge 11A.

Accordingly, in this embodiment, a plurality (e.g., three) of spot laser displacement gauges 11A to 11C is arranged in a given direction (e.g., vertical direction); and when it is determined that the distance to the rail R cannot be measured by the spot laser displacement gauge 11A, the distance to the rail R is then measured by the spot laser displacement gauge 11B.

If it is further evaluated that the distance to the rail R cannot be measured by the spot laser displacement gauge 11B, the distance to the rail R is then measured by the spot laser displacement gauge 11C. In other words, the position of the rail R in relation to the wheel 7 in axle direction is calculated based on the distance measured by any of the spot laser displacement gauges 11A to 11C.

Whether the spot laser displacement gauge 11A could measure the distance to the rail R is evaluated based on whether a measurement result $H_1$ by the spot laser displacement gauge 11A (see FIG. 6) is within a preset range. In other words, when the measurement result $H_1$ is out of the preset range, it is thus evaluated that the spot laser displacement gauge 11A could not measure the distance to the rail R.

The measurement result $H_1$ can be obtained by the following formula:

$$H_1 = L_1 \cdot \sin\theta$$

In the same manner, whether the spot laser displacement gauge 11B could measure the distance to the rail R is evaluated based on whether a measurement result $H_2$ by the spot laser displacement gauge 11B (see FIG. 7) is within the preset range. In other words, when the measurement result $H_2$ is out of the preset range, it is thus evaluated that the spot laser displacement gauge 11B could not measure the distance to the rail R.

The $H_2$ can be obtained by the following formula:

$$H_2 = L_2 \cdot \sin\theta$$

The above "preset range" is stored in the displacement calculation unit 13. The displacement calculation unit 13 evaluates whether the spot laser displacement gauge 11A or 11B could measure the distance to the rail R.

Figure 12:
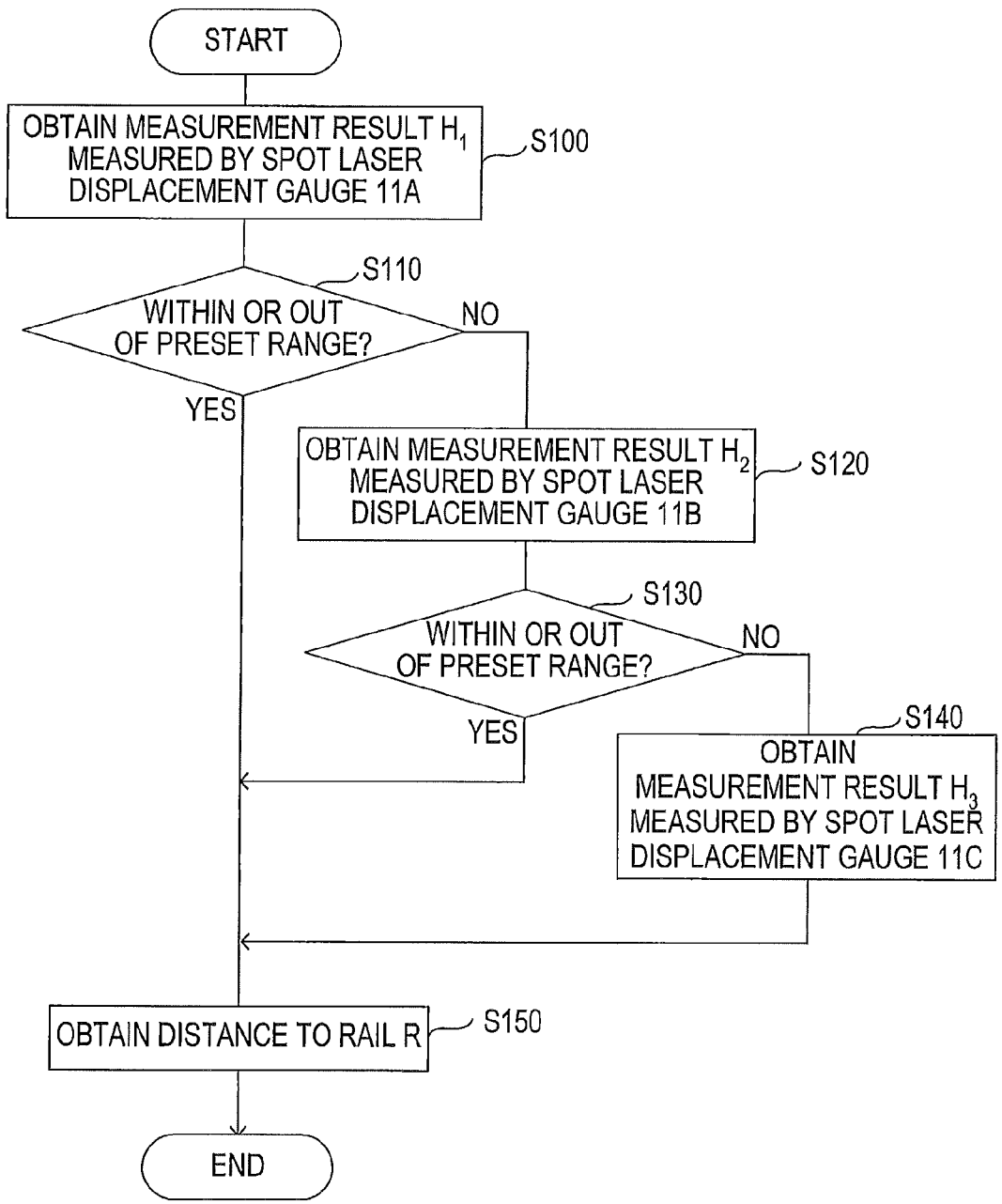
FIG. 12 is a flowchart illustrating processing executed by the displacement calculation unit.

The displacement calculation unit 13 first obtains at step S100, the measurement result $H_1$ measured by the spot laser displacement gauge 11A as shown in FIG. 12.

The process then moves on to S110, and an evaluation takes place as to whether the measurement result $H_1$ is within the preset range.

When it is determined at step S110 that the measurement result $H_1$ is within the preset range (S110: YES), the process then moves on to S150 and the measurement result $H_1$ is obtained as a value that indicates the distance to the rail R. The process is then ended.

Meanwhile, when it is determined at step S110 that the measurement result $H_1$ is out of the preset range (S110: NO), the process then moves on to S120.

The measurement result $H_2$ measured by the spot laser displacement gauge 11B is obtained at step S120.

The process then moves on to S130 and an evaluation takes place as to whether the measurement result $H_2$ is within the preset range.

When it is determined at step S130 that the measurement result $H_2$ is within the preset range (S130: YES), the process then moves on to S150 and the measurement result $H_2$ is obtained as a value that indicates the distance to the rail R. The process is then ended.

Meanwhile, when it is determined at step S130 that the measurement result $H_2$ is out of the preset range (S130: NO), the process then moves on to S140.

The measurement result $H_3$ measured by the spot laser displacement gauge 11C is obtained at step S140.

The process then moves on to S150 and the measurement result $H_3$ is obtained as a value that indicates the distance to the rail R. The process is then ended.

A method to determine which value to use among the values detected by the plurality of the spot laser displacement gauges 11A to 11C is however not limited to the above example; other methods may also be used for determination.

It may be appropriately decided which to use to configure the rail position detection unit 11, the two-dimensional laser displacement gauge or the plurality of the spot laser displacement gauges, based on detection accuracy, costs, and such required for the track status monitoring device.

[Embodiment 3]

Figure 8A:
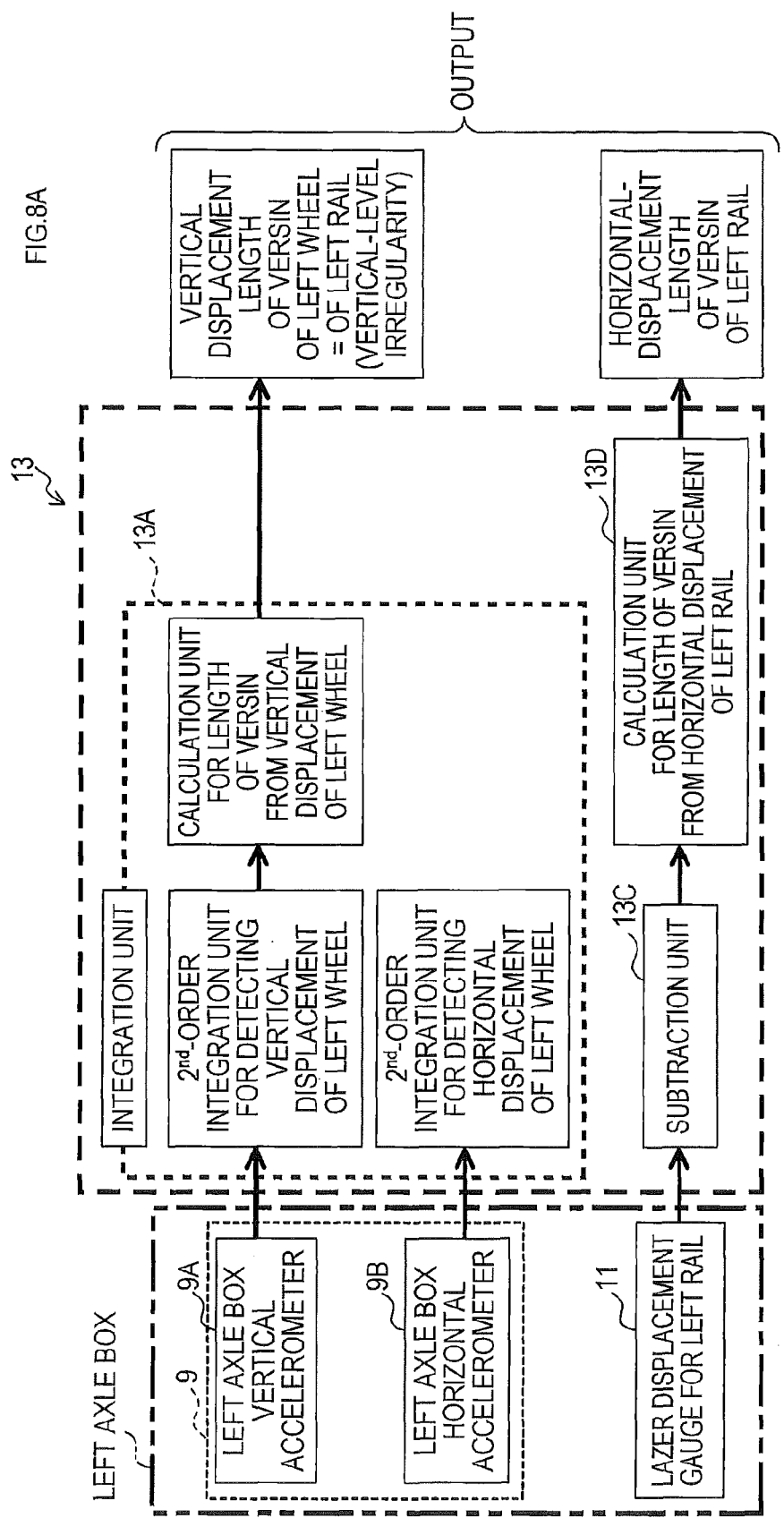
FIG. 8A is a schematic diagram of the displacement calculation unit according to Embodiment 3.
Figure 8B:
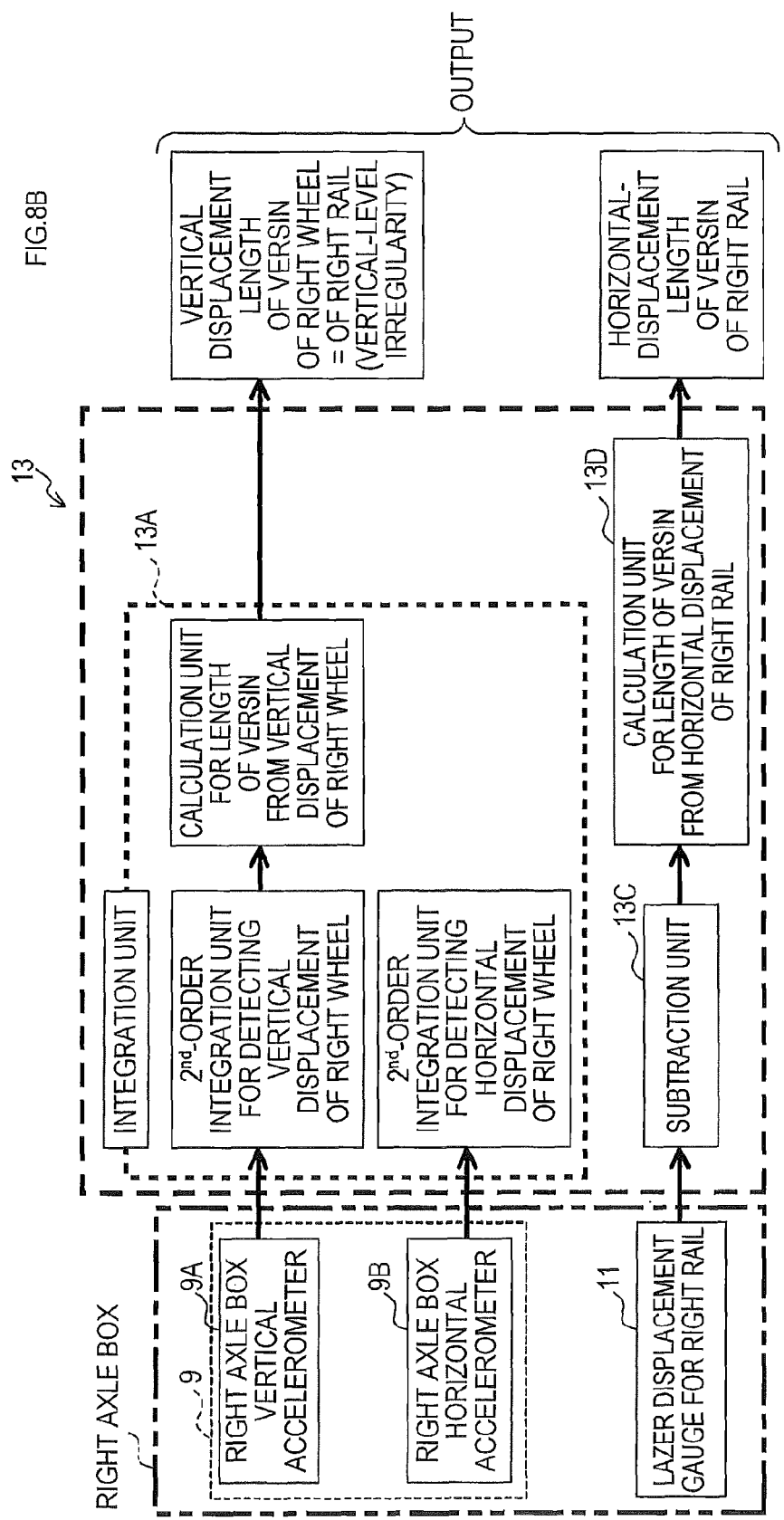
FIG. 8B is a schematic diagram of the displacement calculation unit according to Embodiment 3.

In the above embodiment, the horizontal-direction length of versin is calculated by subtracting the length of relative versin from the length of combined versin; however, as shown in FIGS. 8A and 8B, the horizontal-direction length of versin may be calculated based on the value obtained by subtracting the position of the rail from the $2^{nd}$-order integrated value of the horizontal-direction acceleration, without calculating the length of combined versin and the length of relative versin.

The integration unit 13A according to this embodiment outputs the $2^{nd}$-order integrated value of the acceleration detected by the acceleration detection unit 9 to the subtraction unit 13C without calculating the horizontal-direction length of versin. The subtraction unit 13C subtracts the position of the rail from the $2^{nd}$-order integrated value of the horizontal-direction acceleration.

A length-of-versin calculation unit 13D then calculates the horizontal-direction length of versin based on the value obtained by subtracting the position of the rail from the $2^{nd}$-order integrated value of the horizontal-direction acceleration. In addition, the horizontal-direction length of versin is outputted for each of the left rail and the right rail also in this embodiment.

As a consequence, the number of times to calculate the length of versin can be reduced in this embodiment; thereby processing loads of the displacement calculation unit 13 can be alleviated.

[Embodiment 4]

Figure 9:
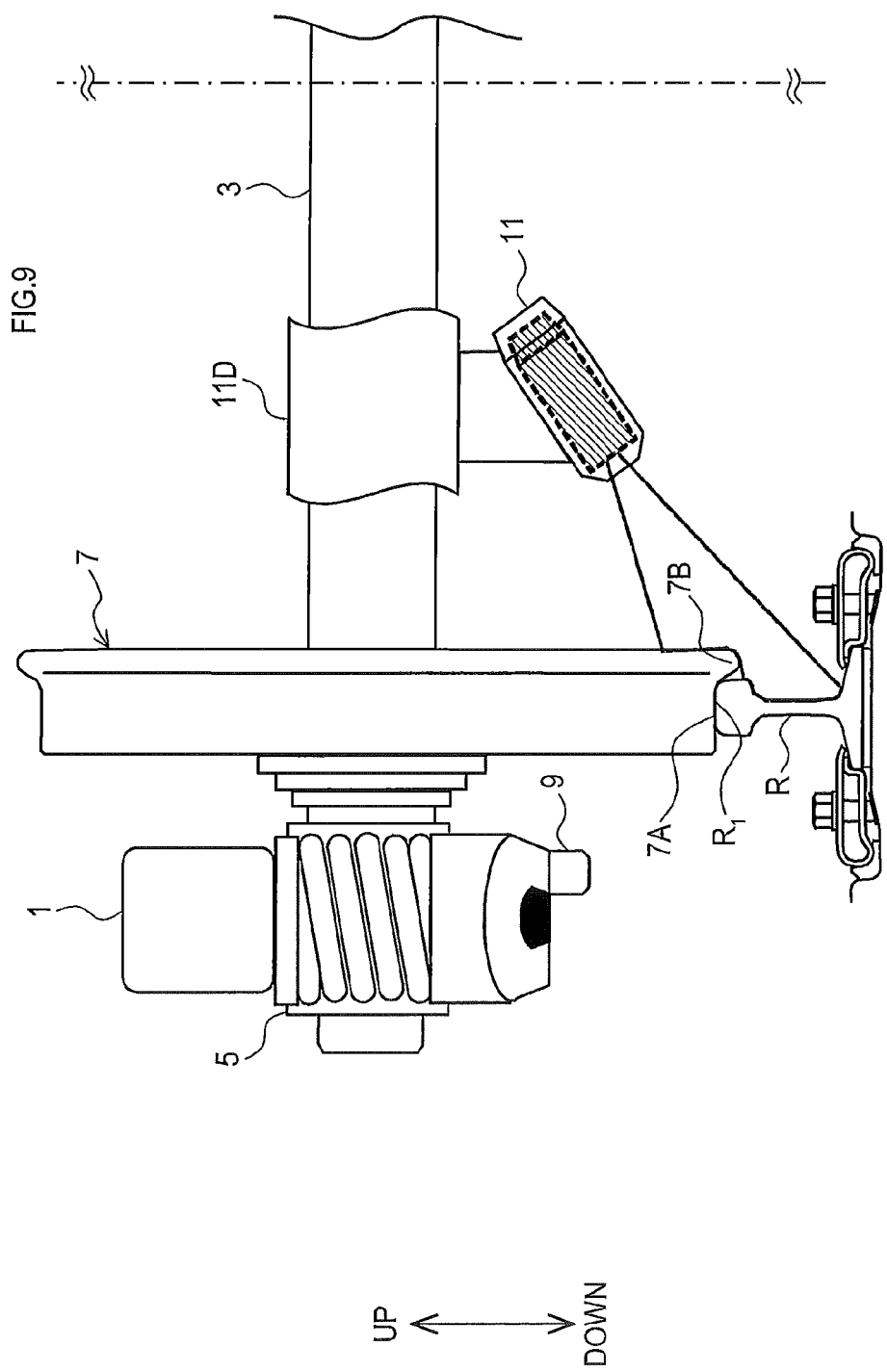
FIG. 9 illustrates a characteristic of Embodiment 4.
Figure 10:
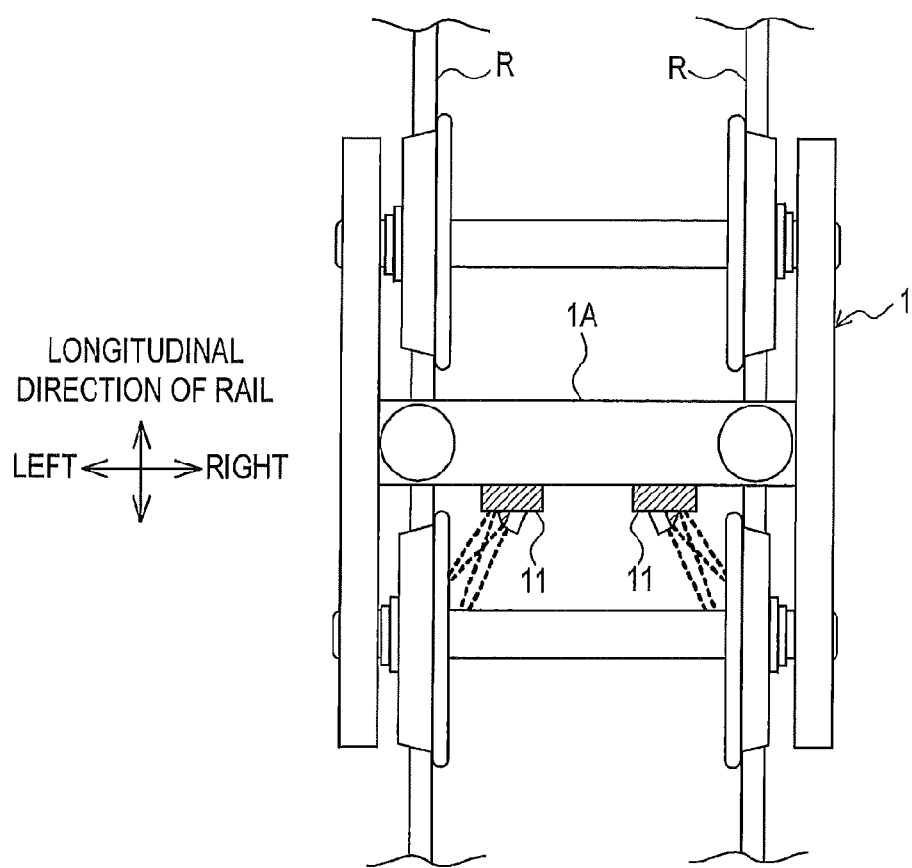
FIG. 10 illustrates a characteristic of Embodiment 4.
Figure 11:
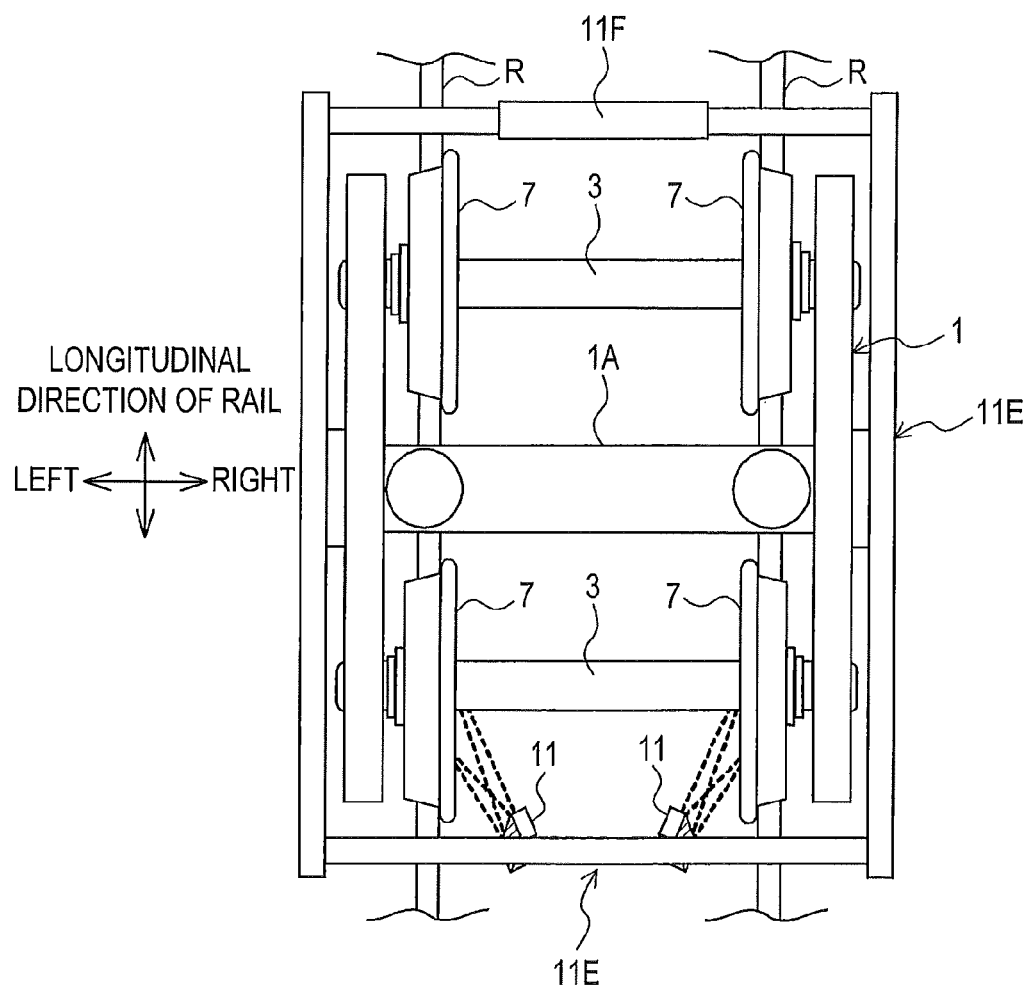
FIG. 11 illustrates a characteristic of Embodiment 4.

In the above embodiments, the outside position of the rail R is detected by the rail position detection unit 11; however, the rail position may also be detected based on the inside position of the rail R as illustrated in FIG. 9 to FIG. 11.

In an example illustrated in FIG. 9, the rail position detection unit 11 is coupled to an axle 3 through an attachment jig 11D. In an example illustrated in FIG. 10, the rail position detection units 11 are coupled to a central beam part 1A that is provided on truck frames 1.

In an example illustrated in FIG. 11, the rail position detection units 11 are coupled to an attachment frame 11E that is combined with the truck frames 1. A counter weight 11F is a weight that is disposed opposite the rail position detection units 11 across the central beam part 1A in the longitudinal direction of the rail R. Further in the example illustrated in FIG. 11, the counter weight 11F suppresses generation of excessive oscillation on the attachment frame 11E during high-speed running.

The rail position detection units 11 illustrated in FIG. 9 to FIG. 11 are configured with the two-dimensional laser displacement gauge; however, this embodiment is not limited thereto. The rail position detection unit 11 may be configured with a plurality of the spot laser displacement gauges 11A to 11C, for example.

[Other Embodiments]

In the above embodiments, the rail position detection unit 11 and the acceleration detection unit 9 are provided on the axle box 5; however, the present invention is not limited thereto. The rail position detection unit 11 and the acceleration detection unit 9 may be provided on a part other than the axle box 5, if the part is a rigid body that is displaced integrally with the wheel 7.

In the above embodiments, rail position detection unit 11 is configured with a non-contact displacement gauge having a light emitting section and a light receiving section; however, the present invention is also not limited thereto.

In the above embodiments, the present invention is applied to the track status monitoring device that detects the amount of the horizontal-direction displacement of the rail for a high-speed railway car to run; however, the present invention is also not limited thereto.

In the above embodiments, the track status monitoring device monitors the state of the rail R during commercial operations; however, the present invention is also not limited thereto. For example, the track status monitoring device may be combined with an exclusive car for monitoring the status of the rail R, or with an exclusive jig. The track status monitoring device may also be combined with a car that is not capable of self-running, and the car may be coupled to another car that is capable of self-running.

In the above embodiments, the state of the rail R is evaluated by using the length of versin; however, the present invention is also not limited thereto. The state of the rail R may be evaluated, for example, just by the value obtained by subtracting the position of the rail from the $2^{nd}$-order integrated value of the horizontal-direction acceleration.

In the above embodiments, the acceleration detection unit 9 is provided on both of the pair of left and right axle boxes 5; however, the acceleration detection unit 9 may also be provided on only one of the pair of left and right axle boxes 5.

In the above embodiments, the exclusive calculation circuit is provided for each length of versin to be calculated, and these calculation circuits are actuated laterally; however, the present invention is also not limited thereto.

For example, it is possible to provide a shared exclusive calculation circuit and calculate multiple types of length of versin sequentially by the calculation circuit. It is also possible to calculate the above lengths of versin by installing software (program) to a calculation unit with high versatility, such as a computer configured with a CPU, ROM, and RAM, etc., without providing a calculation circuit (hardware) for the exclusive calculation circuit.

Furthermore, the present invention is only required to be consistent with the purpose of the invention described in the claims, and is not limited to the above-mentioned embodiment.

What is claimed is:

1. A track status monitoring device that detects an amount of horizontal-direction displacement of a rail for a railway car to run, the device comprising:
    an acceleration detection unit that is disposed on the railway car and detects an acceleration at least in axle direction among accelerations generated on a wheel of the railway car;
    a rail position detection unit that is disposed on the railway car, wherein a position of the rail in relation to the rail position detection unit and a position of the wheel in relation to the rail position detection unit are detected, and based on both detected positions, a value indicating a position of the rail in relation to the wheel in the axle direction is detected;
    an integration unit that calculates a value based on a $2^{nd}$-order integrated value of the acceleration detected by the acceleration detection unit; and
    a subtraction unit that counterbalances an undulating component of the wheel by subtracting a value detected by the rail position detection unit from a value calculated by the integration unit and calculates an amount of horizontal-direction displacement of the rail.

2. The track status monitoring device according to claim 1, wherein the rail position detection unit and the acceleration detection unit are provided on a rigid body that is integrally displaced with the wheel.

3. The track status monitoring device according to claim 2, wherein the rigid body is an axle box that supports an axle of the wheel.

4. The track status monitoring device according to claim 1, wherein the rail position detection unit is a non-contact displacement gauge that comprises a light emitting section and a light receiving section.

5. The track status monitoring device according to claim 4, wherein the rail position detection unit comprises a two-dimensional laser displacement gauge.

6. The track status monitoring device according to claim 4, wherein the rail position detection unit comprises a plurality of spot laser displacement gauges that are arranged in parallel.

* * * * *